March 25, 1958    H. W. HOSFORD, JR    2,828,043
VACUUM CONTAINER
Filed Sept. 28, 1954
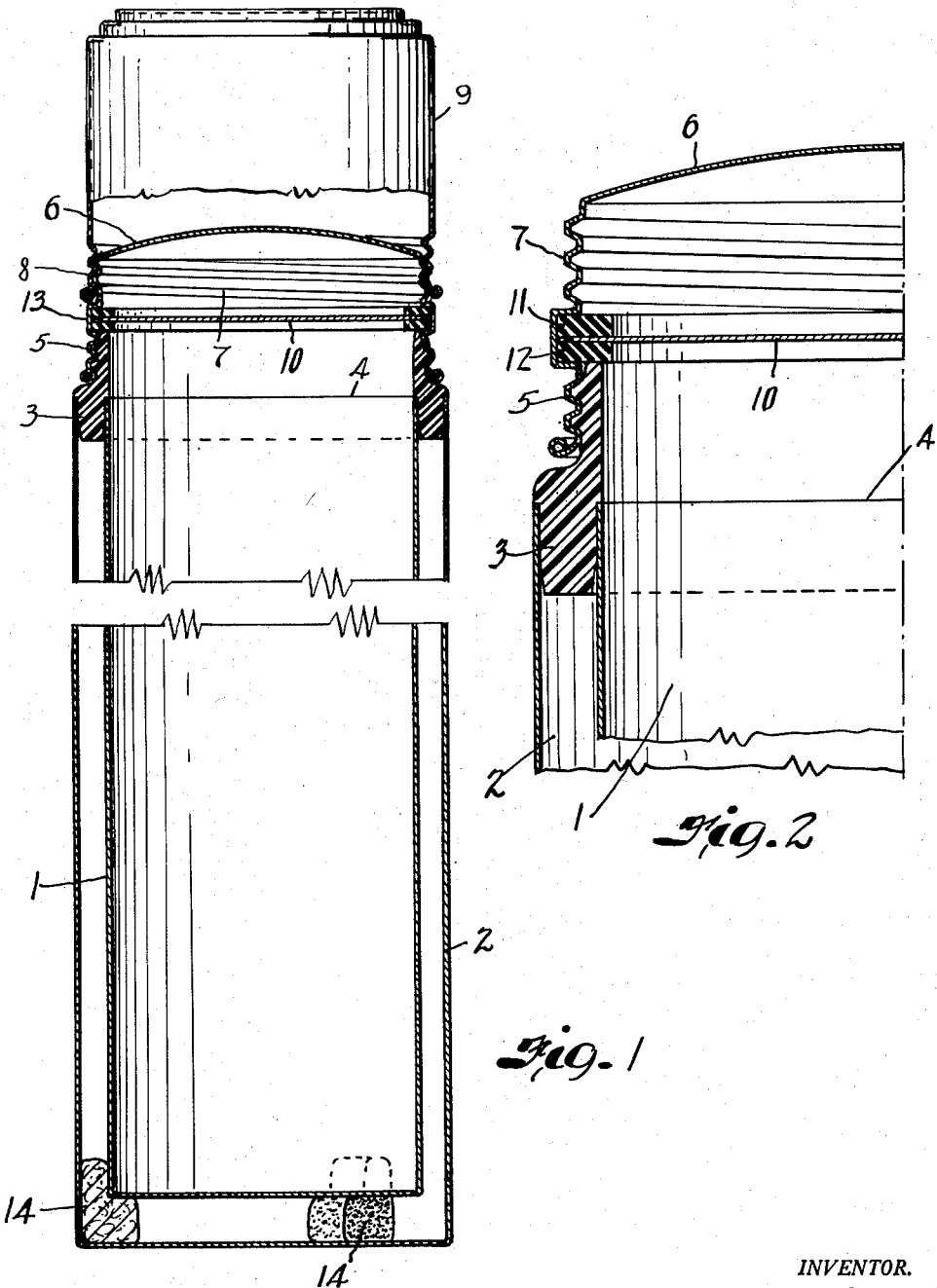
INVENTOR.
HARRY W. HOSFORD, JR.
BY
Oberlin & Limbach
ATTORNEYS.

United States Patent Office 2,828,043
Patented Mar. 25, 1958

2,828,043

VACUUM CONTAINER

Harry W. Hosford, Jr., Shaker Heights, Ohio

Application September 28, 1954, Serial No. 458,893

1 Claim. (Cl. 220—15)

This invention relates as indicated to a vacuum container, and more particularly to an improved vacuum bottle for hot or cold foods and liquids.

Various types of insulated containers are well known for the purpose of carrying foods and beverages and insulating them over extended periods of time in order that they may retain their heat or in the case of chilled materials, be maintained in such chilled condition. The best known form of such vacuum container utilizes an elongated double walled glass inner receptacle having a vacuum in the space between the inner and outer walls. The exterior of such receptacle is ordinarily silvered and the receptacle mounted within an outer shock resistant casing. Despite all precautions, however, such glass receptacles are very fragile and frequently require replacement. When an effort is made to provide really adequate protection, the resultant assembly becomes very bulky and heavy out of all proportion to the quantity of food or other material which may be carried therein.

Other forms of insulated containers of more recent development are also widely employed, ordinarily comprising an inner metal or enameled receptacle and an outer casing with an insulating packing of Fiberglas, kapok, or like material interposed therebetween. Such containers have the advantage of being much less fragile than the glass vacuum bottles but they are likewise bulky and heavy and do not afford the same high degree of temperature protection as does the vacuum bottle.

It is accordingly a principal object of my invention to provide an improved vacuum container or bottle which will be very light in weight, of minimum bulk, and substantially unbreakable.

A further object is to provide such improved vacuum container in a form facilitating its manufacture at low cost.

Still another object is to provide such container in a form adapting its use for a wide variety of purposes.

Other objects of the invention will appear as the description proceeds.

To the accomplishment of the foregoing and related ends, said invention then comprises the features hereinafter fully described and particularly pointed out in the claim, the following description and the annexed drawing settting forth in detail certain illustrative embodiments of the invention, these being indicative, however, of but a few of the various ways in which the principle of the invention may be employed.

In the annexed drawing:

Fig. 1 is a longitudinal vertical section through one embodiment of my invention; and Fig. 2 is an enlarged fragmentary longitudinal section through the upper end and inner cap of the container.

Referring now more praticularly to the drawing, the embodiment of my invention there illustrated may comprise a deep drawn cylindrical inner receptacle 1 of aluminum joined to a similar, somewhat larger outer container 2 likewise of aluminum by means of a nylon gasket and collar 3. The space between the walls of the inner receptacle and outer container is evacuated and sealed by such nylon gasket which is, moreover, cemented to both members. The inner cylindrical surface of the nylon collar is recessed slightly at 4 to receive the upper end of inner receptacle 1 without any shoulder or recess being formed, the inner surface of the collar constituting a cylindrical continuation of the inner cylindrical surface of receptacle 1. The outer protruding surface of the collar is threaded to receive the threaded lower portion 5 of a hollow aluminum inner cap 6. Inner receptacle 1 is thus firmly supported by gasket 3 entirely out of contact with the outer container 2.

The upper cylindrical portion of inner cap 5 is threaded at 7 to receive the lower threaded flange 8 of an outer aluminum cup 9 adapted to serve as a drinking cup or the like. An aluminum disc or diaphragm 10 is secured between annular rubber rings or gaskets 11 and 12 fitting in a peripheral recess 13 in cap 6 intermediate threaded portions 5 and 7. The inner such gasket 11 is cemented in place to afford an airtight seal and the interior of cap 6 is evacuated to insulate the same. Disc 10 is of slightly smaller diameter than rings 11 and 12 and is cemented to one or preferably both of such rings with its outer periphery spaced from contact with cap 6. When the inner cap 6 is screwed down tightly on nylon collar 3, it will be seen that the upper edge of such collar abuts the lower rubber ring or gasket 12. Accordingly, the contents of inner receptacle 1 are wholly insulated from any effective heat transfer means. By far the larger portion of such receptacle is surrounded by the vacuum between the same and outer container 2. The nylon gasket 3 has very poor heat conducting qualities as do likewise the rubber rings 11 and 12. Aluminum diaphragm 10 which constitutes the principal closure to the receptacle 1 is secured between such non-conductive rings 11 and 12 with a vacuum being provided within inner cap 6 and there is no metal-to-metal contact between such diaphragm and cap. There is accordingly very little opportunity for heat transfer from or to the contents of the inner receptacle.

It will be seen, furthermore, that my new vacuum container construction is extremely lightweight but at the same time substantially non-breakable. The outer cap 9, of course, assists in protecting inner cap 6, and such inner cap may desirably be domed as shown to resist the internal vacuum and to permit the employment of relatively thin sheet aluminum. Nylon (a polyamide resin) is a preferred material for the collar in view of its low heat conductivity, toughness, and low taste imparting qualities. Various other plastic materials may, however, be employed for the collar and rings, if desired, including polyethylene, polystyrene, and the polyvinyl plastics (polymers and copolymers of polyvinyl chloride and polyvinyl acetate). Suitable cements for bonding and sealing the gaskets include Angier Products Co. SB505 cement (a synthetic rubber-ketone base cement), B. B. Chemical Co. Bostik 4585 cement, and Armstrong Products Co. A-1, A-2, A-3 and A-6 epoxy resin cements. While aluminum is much preferred for the receptacle, container and caps, other metals such as the heavier and more expensive stainless steel can be utilized if desired.

When the receptacle is especially elongated it is sometimes desirable to provide supporting means adjacent its other end to relieve strain on the nylon collar. Such support may be in the form of three felt or glass-fiber pads such as 14 spaced 120° apart circumferentially of the bottom end of the container and extending a short distance up the sides, as shown, such pads being cemented in place. The outer shell and inner receptacle will ordinarily both be of light gauge aluminum but, if desired, such outer closure may be of other metal or plastic. The diaphragm of the closure is located close to the threads of the latter so as to lie directly across the mouth of the receptacle and prevent sloshing of the contents.

Other modes of applying the principle of the invention may be employed, change being made as regards the details described, provided the features stated in the following claim or the equivalent of such be employed.

I therefore particularly point out and distinctly claim as my invention:

A closure for a vacuum container or the like comprising a light gauge aluminum cup-shaped member threaded adjacent its opening for attachment to such container, a recess in the inner wall of said member inwardly of such threaded portions, a pair of plastic thermo-insulating rings fitted within said recess, and a light gauge aluminum diaphragm secured between said rings and sealing off a cavity therebehind, such cavity being evacuated and the outer of said plastic rings being exposed for engagement with the lip of such container when said closure is threadedly attached thereto whereby tightening of said closure on said container serves both to seal said lip against said outer plastic ring and also to squeeze said diaphragm between said pair of rings.

References Cited in the file of this patent

UNITED STATES PATENTS

| | | |
|---|---|---|
| 1,326,124 | Vischer | Dec. 23, 1919 |
| 1,639,101 | O'Brien et al. | Aug. 16, 1927 |
| 1,651,655 | Wright et al. | Dec. 6, 1927 |
| 2,031,855 | Rollason | Feb. 25, 1936 |
| 2,207,543 | Knapp | July 9, 1940 |
| 2,387,978 | Casey | Oct. 30, 1945 |
| 2,484,309 | Noeth | Oct. 11, 1949 |
| 2,561,294 | Schuler | July 17, 1951 |
| 2,633,264 | Dinsmore et al. | Mar. 31, 1953 |

FOREIGN PATENTS

| | | |
|---|---|---|
| 1,055,504 | France | Oct. 14, 1953 |